United States Patent
Malarky (10) Patent No.: US 9,813,107 B2
(45) Date of Patent: Nov. 7, 2017

(54) ADAPTIVE ECHO CANCELLATION FOR RFID SYSTEMS

(71) Applicant: Kapsch TrafficCom AG, Vienna (AT)

(72) Inventor: Alastair Malarky, Petersburg (CA)

(73) Assignee: Kapsch TrafficCom AG, Vienna (AT)

(*) Notice: Subject to any disclaimer, the term of this patent is extended or adjusted under 35 U.S.C. 154(b) by 24 days.

(21) Appl. No.: 14/288,851

(22) Filed: May 28, 2014

(65) Prior Publication Data

US 2014/0357202 A1    Dec. 4, 2014

(51) Int. Cl.
| | |
|---|---|
| *H04W 4/00* | (2009.01) |
| *H04B 1/62* | (2006.01) |
| *G06K 7/10* | (2006.01) |
| *H04B 1/525* | (2015.01) |

(52) U.S. Cl.
CPC ............ *H04B 1/62* (2013.01); *G06K 7/10009* (2013.01); *G06K 7/10346* (2013.01); *H04W 4/008* (2013.01); *H04B 1/525* (2013.01)

(58) Field of Classification Search
CPC ..... H04B 5/005; H04B 5/0068; H04B 5/0062
USPC ...................... 455/41.1, 41.2, 41.3
See application file for complete search history.

(56) References Cited

U.S. PATENT DOCUMENTS

| | | | |
|---|---|---|---|
| 2006/0098765 A1 | 5/2006 | Thomas et al. | |
| 2006/0111051 A1* | 5/2006 | Barink ................ | G06K 7/0008 455/70 |
| 2006/0183454 A1 | 8/2006 | Al-Mahdawi | |
| 2008/0041953 A1* | 2/2008 | Frederick et al. ........... | 235/451 |
| 2008/0242245 A1* | 10/2008 | Aparin .................. | H04B 1/525 455/126 |
| 2009/0130981 A1* | 5/2009 | Nagai et al. ................. | 455/63.1 |
| 2009/0232260 A1* | 9/2009 | Hayashi et al. .............. | 375/346 |

OTHER PUBLICATIONS

Extended European Search Report received for European Patent Application No. 14163487.3, dated Nov. 5, 2014, 6 pages.
Examination Report received for Mexican Patent Application No. MX/a/2014/006403, dated Jul. 23, 2015, 6 pages.

* cited by examiner

*Primary Examiner* — Wen Huang
(74) *Attorney, Agent, or Firm* — Fiala & Weaver P.L.L.C.

(57) ABSTRACT

A radio-frequency identification (RFID) reader having fast-adaptive echo cancellation for backscatter-modulated signals is described. The echo cancellation includes subtracting an RF-level cancel signal from the received signal, where the cancel signal is generated based upon an error measured in the receive signal after down-conversion to baseband and low-pass filtering. The cancel signal is based upon a cumulative sum or integral of error signals and an estimated complex-valued transfer function of the scaling circuit. Methods of quick calibration of the reader are described, including accounting for circuit offsets and determining the estimated complex-valued transfer function.

20 Claims, 3 Drawing Sheets

PRIOR ART

ADAPTIVE ECHO CANCELLATION FOR RFID SYSTEMS

CROSS-REFERENCE TO RELATED APPLICATION(S)

This application claims priority to Canadian Patent Application No. 2,818,401 filed on May 29, 2013, the entirety of which is incorporated by reference herein.

BACKGROUND

Technical Field

The present application relates to radio frequency identification (RFID) systems and, in particular, to echo cancellation within such systems.

Background Art

In a backscatter-based RFID system, the reader broadcasts a continuous-wave carrier signal. The reader may modulate the continuous-wave carrier signal to send an information signal to any transponders (also called 'tags') in range. A nearby transponder sends a reply signal by modulating the impedance of its receive antenna. In very general terms, the backscatter modulation may involve switching the transponder antenna between a short-circuit condition and an open-circuit condition to change the reflective/absorptive characteristic of the load seen by the continuous-wave carrier signal. The reader includes a receive antenna (which may be the same as the transmit antenna in many cases), that receives the reflected continuous-wave carrier signal.

Some backscatter transponders lack an internal power source, like a battery, and rely upon the energy of the received carrier signal to power the transponder circuitry. These are generally termed "passive" RFID systems. Backscatter modulation is common in passive RFID systems, but may also be used in "active" RFID systems in which the transponder has its own power source, e.g., a battery.

Figure 1:
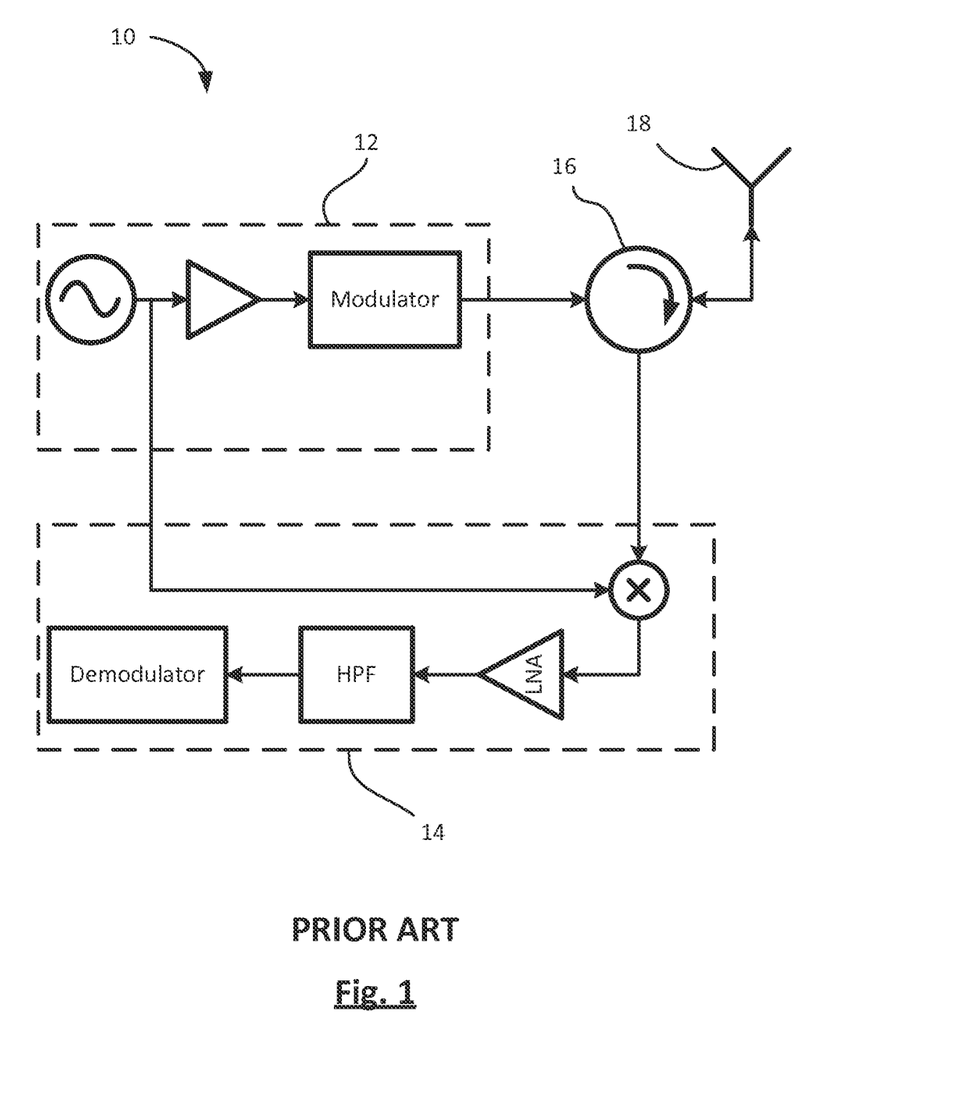
FIG. 1 shows, in block diagram form, an example of a reader for a backscatter-based RFID system.

FIG. 1 shows a simplified block diagram of an example reader 10 for a backscatter-based RFID system. The reader 10 includes a transmitter section 12, a receiver section 14, a circulator 16, and an antenna 18. The transmitter section 12 in this example includes a signal generator for generating the carrier wave at an RF frequency, an amplifier, and, optionally, a modulator for modulating the carrier wave with an information signal. The carrier wave (modulated or unmodulated) is broadcast using the antenna 18. A reflected wave from a nearby transponder induces a signal in the antenna 18 that is received by the receiver section 14, where it is downconverted using the carrier wave, amplified, filtered, and then demodulated to recover whatever signal the transponder imposed on the reflected carrier wave.

There are a number of sources of leakage of the transmitter section 12 into the receiver section 14 in the example reader 10. Leakage signals caused by transmissions that reach the receiver section 14 may be referred to as "echo" signals, although not all types constitute actual reflection echo signals. Some example sources include (a) leakage from transmitter section 12 to receiver section 14 through the circulator 16, (b) reflections due to RF mismatches in the RF path to the antenna 18 (assuming a common antenna is used for transmitting/receiving), (c) coupling between antennas (in the case of separate transmit and receive antennas), and (d) reflections from objects in view of the antenna 18, including moving objects like vehicles. Any or all of these sources may result in unwanted RF-level signal in the receiver resulting from the transmitter.

It will be noted that the receiver section 14 downconverts the received signal using a carrier-wave frequency shift, and then uses a high-pass filter to eliminate the carrier-wave frequency signal that has been downconverted to baseband, leaving just the transponder information signal. However, large unwanted echo signal can be large enough to degrade the reader 10 performance. For example, the echo signal may be larger than the amplifier or downconverter can tolerate. Furthermore, the phase noise of the unwanted echo signal may be large enough to degrade the modulation sideband of the transponder information signal, causing the demodulator to fail to properly recover the transponder information at the minimum required power.

U.S. Pat. No. 6,192,222 to Greef et al. and U.S. Pat. No. 7,986,931 to Lin et al. both describe echo cancellation circuits for an RFID reader that are intended to remove leakage signal from a backscatter modulated signal. The system described by Greef et al. uses a variable attenuator and a variable phase shifter to create a signal that is then subtracted from the received RF-level signal, so as to minimize the power level of the carrier wave frequency component in the received signal. The system described by Lin et al. involves multiplying the carrier wave signal by a complex gain factor and then subtracting the resulting RF signal from the received RF-level signal, so as to minimize the power level of the carrier wave frequency component in the received signal.

Unfortunately, both the systems of Greef et al. and Lin et al. employ search algorithms and require many iterations to converge and are not practical for use in systems where speed is important.

BRIEF DESCRIPTION OF THE DRAWINGS/FIGURES

Reference will now be made, by way of example, to the accompanying drawings which show embodiments of the present subject matter. In the figures.

Similar reference numerals are used in different figures to denote similar components.

Embodiments will now be described with reference to the accompanying drawings. Similar reference numerals are used in different figures to denote similar components

DETAILED DESCRIPTION

In one aspect, the present application discloses a method for echo cancellation in a reader for a passive RFID system. The method includes transmitting a carrier signal and receiving a backscatter-modulated signal, combining a cancel signal with the backscatter-modulated signal to obtain a corrected signal, downconverting the corrected signal to a baseband signal using the carrier signal, low-pass filtering the baseband signal to remove modulated transponder information and produce an error signal, and updating the cancel signal, wherein the cancel signal is based upon the error signal, the carrier signal, and an estimated complex-valued transfer function In another aspect, the present application describes an RFID reader including an antenna, a transmitter section to generate a carrier signal, and a receiver section coupled to the antenna for receiving a backscatter-modulated signal from a transponder. The receiver section includes an echo canceller including a combiner to combine the backscatter-modulated signal with a cancel signal to produce a corrected signal, a down-converter to down-convert the corrected signal to a baseband signal using the carrier signal, and a demodulator to demodulate the baseband signal to obtain transponder information. The echo canceller low-pass filters modulated transponder information out of the baseband signal to obtain an error signal and generates the cancel signal based upon the error signal, the carrier signal, and an estimated complex-valued transfer function.

In yet another aspect, the present application describes a method of calibrating a reader for echo cancellation in an RFID system, the reader including a transmit section to generate a carrier signal and a receive section including a combiner coupled to an antenna through a first switch, the receive section further including a cancel signal generator to produce a cancel signal to be input to the combiner and a downconverter coupled to the output of the combiner to produce a downconverted combined signal. The method includes opening the first switch to isolate the receive section from the antenna; while the first switch is open, setting the cancel signal to a predetermined level, low-pass filtering the downconverted combined signal to obtain an initial error signal, and determining an estimated complex-valued transfer function for the cancel signal generator based upon the predetermined level and the initial error signal; closing the first switch, and updating the cancel signal based upon a ratio of a newly-measured error signal to the estimated complex-valued transfer function.

In yet a further aspect, the present application describes a RFID reader that includes an antenna, a transmitter section to generate a carrier signal, and a receiver section coupled to the antenna for receiving a backscatter-modulated signal from a transponder. The receiver section includes an echo canceller including a combiner to combine the backscatter-modulated signal with a cancel signal to produce a corrected signal, a down-converter to down-convert the corrected signal to a baseband signal using the carrier signal, a first switch to couple the antenna to the combiner, and a demodulator to demodulate the baseband signal to obtain transponder information. The echo canceller is configured to open the first switch and, while the first switch is open, set the cancel signal to a predetermined level, low-pass filter the baseband signal to obtain an initial error signal, and determine an estimated complex-valued transfer function based upon the predetermined level and the initial error signal. The echo canceller updates the cancel signal based upon a ratio of a newly-measured error signal to the estimated complex-valued transfer function.

Other aspects and features of the present subject matter will be apparent to those of ordinary skill in the art from a review of the following detailed description when considered in conjunction with the drawings.

In the description that follows, example embodiments are described in which RFID systems are used for electronic toll collection (ETC). The methods and devices described in the present application are not limited in application to ETC implementations or, indeed, to other intelligent transportation systems (ITS), but may be applied to other RFID-based systems.

In some RFID systems, there is a limited time available for communication, which puts a premium on the system's ability to adapt quickly. As an example, ITS implementations often involve timing restrictions that make fast adaptation important. ITS operations typically involve transponders mounted to vehicles, which may be moving at highway speeds, and readers which are stationary, or both may be moving but in different directions. In such situations, the RFID transponder may only be present in a reader coverage area for a very short period of time, e.g., less than 100 milliseconds. A single RFID transmission may constitute a relatively significant fraction of the available communication time. For example, in at least one example protocol, the information burst is approximately 13 milliseconds in length.

Another complication in ETC implementations is that the echo signal due to vehicle reflections may undergo a time-varying Doppler shift. The resulting echo signal may exhibit rapid amplitude and phase changes. In one example, an ETC system using a carrier frequency near 900 MHz can experience echo signals that undergo a phase change of 2000 degrees and a signal strength change of a factor of 10 during the available communication time. As another example, such a system may involve echo signals that undergo more than 360 degrees of phase shift in a single information burst.

Such systems may also involve a combination of static and time-varying multi-path reflections, leading to a complex and rapidly-changing echo signal both in magnitude and phase.

The present application discloses methods and readers for fast adaptive echo cancellation which can respond to such rapid changes in the echo signal.

Figure 2:
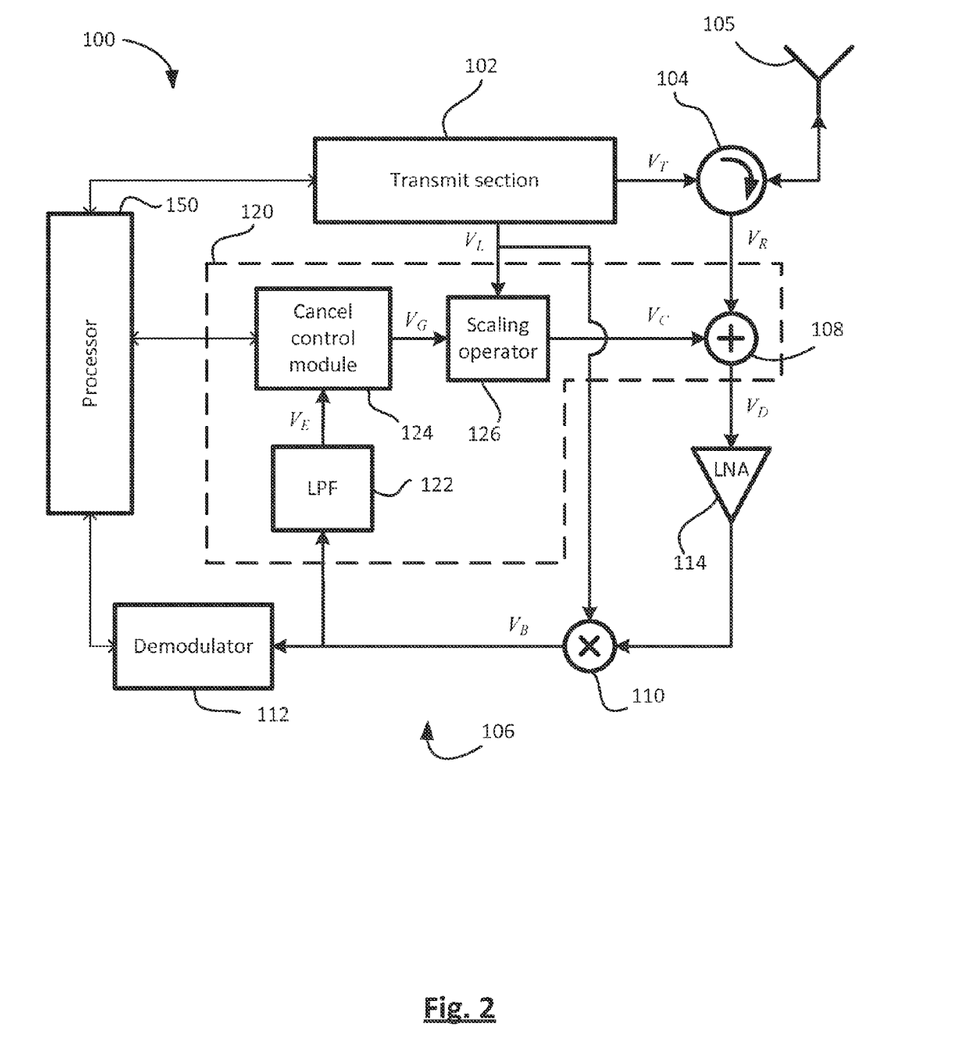
FIG. 2 shows, in block diagram form, an example embodiment of a reader with echo cancellation.

Reference is first made to FIG. 2, which shows a simplified block diagram of an example reader 100. The reader 100 includes a transmitter section 102, a receiver section 106, a circulator 104, and an antenna 105. It will be understood that in some other implementations, the circulator 104 may be replaced with a coupler, a combiner, or other such element allowing for shared use of the antenna 105 by the transmitter section 102 and the receiver section 106. In some other implementations, the circulator 104 is omitted and the reader 100 includes separate receive and transmit antennas.

The transmitter section 102 includes a carrier wave signal generator, a modulator and one or more amplifiers. The receiver section 106 includes a down-converter 110, a low-noise amplifier (LNA) 114, a demodulator 112, and an echo canceller 120. The echo canceller 120 includes a low-pass filter 122, a cancel control module 124, a scaling operator 126, and a combiner 108.

The scaling operator 126 receives a carrier wave signal $V_L(t)$ from the transmitter section 102 and a complex scaling control signal $V_G(t)$ from the cancel control module 124. The scaling operator 126 produces a cancel signal $V_C(t)$ and provides it to the combiner 108. The combiner 108 in this embodiment subtracts the cancel signal $V_C(t)$ from the received RF signal $V_R(t)$. The received signal $V_R(t)$ is the signal induced in the antenna 105 by a transponder and, in this example, is a backscatter-modulated signal. We denote $V_U(t)$ to be the unwanted echo or leakage signal present in the received signal $V_R(t)$.

The combiner 108 outputs a corrected signal $V_D(t)$. The corrected signal $V_D(t)$ is the received signal $V_R(t)$ corrected by the cancel signal $V_C(t)$, which, in this case involves subtracting the cancel signal $V_C(t)$ from the received signal $V_R(t)$. The corrected signal $V_D(t)$ may then be amplified by the LNA 114. Other operations may also occur, such as band-pass filtering (not illustrated).

The down-converter 110 then down-converts the corrected signal $V_D(t)$ to a baseband signal $V_B(t)$ using the carrier wave signal $V_L(t)$ from the transmitter section 102. The demodulator 112 demodulates the baseband signal $V_B(t)$. The demodulation may include high pass filtering the baseband signal $V_B(t)$ to try to remove any residual echo or leakage signal at or near baseband (after down-conversion). The filtered baseband signal is then demodulated in accordance with the modulation scheme being used by the RFID system.

The echo canceller 120 receives the baseband signal $V_B(t)$ and low-pass filters it using the low-pass filter 122 to remove the modulated transponder information in the sideband. The resulting error signal $V_E(t)$ is representative of the down-converted echo or leakage signal.

Based on the error signal $V_E(t)$, the cancel control module 124 updates its scaling control signal $V_G(t)$. In particular, the cancel control module 124 generates the scaling control signal $V_G(t)$ based, at least in part, on an estimated complex-valued transfer function, denoted $\hat{\beta}$. The estimated complex-valued transfer function $\hat{\beta}$ represents a complex-valued feedback relationship between the error signal $V_E(t)$ and the scaling control signal $V_G(t)$.

Application of the cancel signal $V_C(t)$ produces a cleaner corrected signal $V_D(t)$, which results in a smaller error signal $V_E(t)$, which then in turn is used to update the scaling control signal $V_G(t)$. Under constant conditions, the reader 100 quickly reaches a steady-state in which the scaling control signal $V_G(t)$ results in a cancel signal $V_C(t)$ that reduces the error signal $V_E(t)$ to zero. Moreover, in the event of changes in the echo or leakage signal $V_U(t)$, even rapid phase and amplitude changes, the resulting error signal $V_E(t)$ quickly leads to adjustments of the scaling control signal $V_G(t)$ that cause the cancel signal $V_C(t)$ to respond to and track the changes in the echo/leakage signal $V_U(t)$.

The cancel control module may sample the error signal $V_E(t)$ and generate the scaling control signal $V_G(t)$ at discrete time intervals. Each new sample of $V_E(t)$ will contain the residual error after application of the previous $V_G(t)$. Alternatively, the cancel control module may integrate $V_E(t)$ over time and generate $V_G(t)$ with an appropriate scaling factor to account for the integration. In general terms, the scaling control signal $V_G(t)$ is proportional to the cumulative sum of the samples of error signals $V_E(t)$, e.g., the integral of $V_E(t)$. As the error signal $V_E(t)$ converges to zero no further adjustments are made to the scaling control signal $V_G(t)$, and if there is a rapid change in the leakage or echo signal, the corresponding rapid change in the error signal $V_E(t)$ leads to an equally rapid change in the scaling control signal $V_G(t)$. The window over which the cumulative sum/integral is performed may depend on the implementation.

The reader 100 may include a processor 150 or other such controller configured to control the various portions of the reader 100 to implement the desired modulation scheme.

The above example presumes that the reader 100 has been pre-configured with an estimated complex-valued transfer function $\hat{\beta}$. In some implementations, an example reader may be configured to conduct a brief calibration phase in order to determine the estimated complex-valued transfer function $\hat{\beta}$. In some implementations, the calibration phase may be performed once during initial set-up of the reader. In some examples, the calibration phase may be re-performed periodically to update or correct the estimated complex-valued transfer function $\hat{\beta}$, since, over time, the complex-valued transfer function $\beta$ may change due to drift or longer-term changes in circuit components.

In one implementation, the relationship between the error signal $V_E(t)$ and the scaling control signal $V_G(t)$ is given by:

$$V_G(t) = -\frac{1}{\hat{\beta}}\left(\sum_{t=0}^{n-1} V_E(t)\right)$$

where each value of t represents a time sample at which $V_E(t)$ is the residual after the previous value of $V_G(t)$ has taken effect.

It will be appreciated that the above equation could be expressed in integral form in another embodiment. For example, it may be expressed as:

$$V_G(t) = -\frac{K_I}{\hat{\beta}}\left(\int_{t=0}^{T} V_E(t)\right)$$

where $K_I$ is an integration scaling factor.

In one implementation, the cancel signal $V_C(t)$ is generated by the scaling operator 126 as follows (the time index has been omitted for brevity):

$$V_C = K_C \times V_G \times V_L$$

In the above expression, $V_L$ is the carrier wave signal from the transmitter section 102 and $K_C$ is a complex circuit transfer characteristic that partially incorporates the basic scaling or gain function of the scaling operator 126 and incorporates some delay term.

Figure 3:
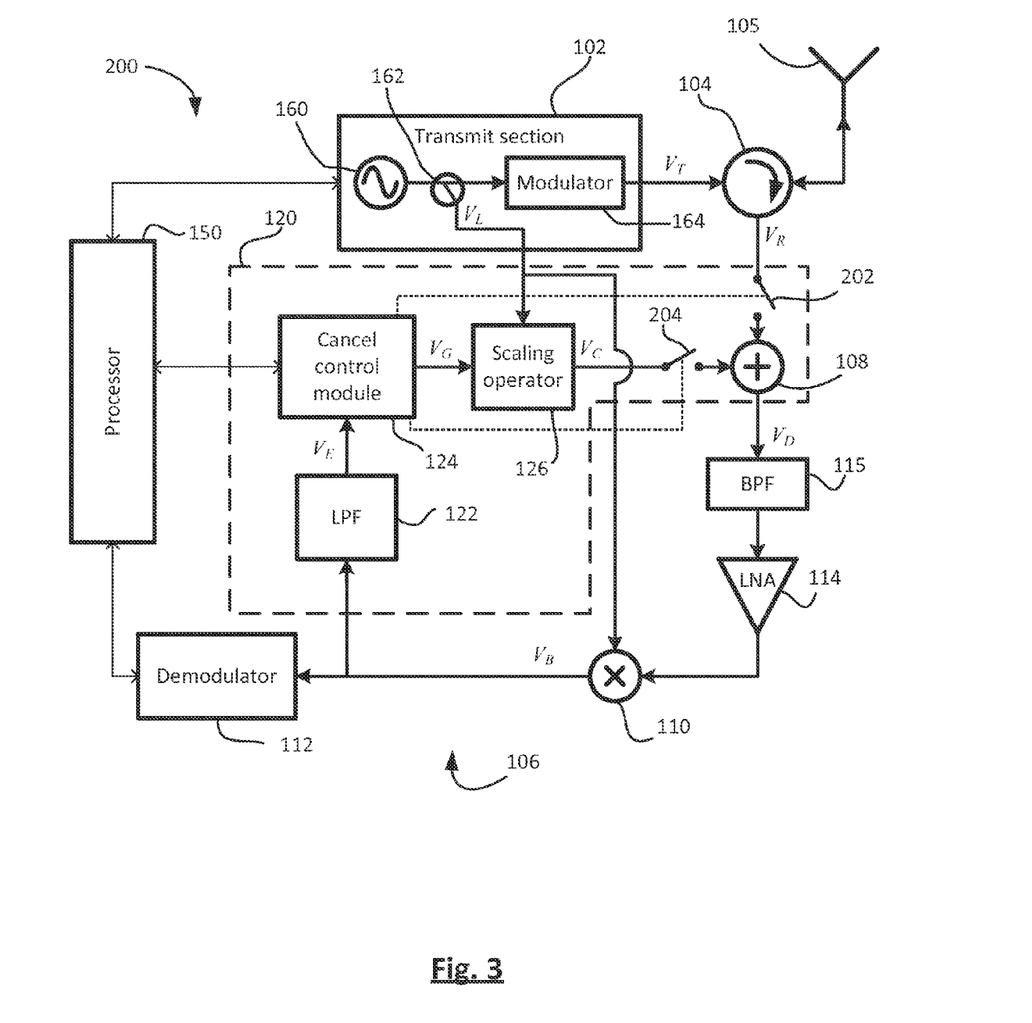
FIG. 3 shows, in block diagram form, another example embodiment of a reader with echo cancellation.

In some embodiments, the reader may be configured to permit rapid calibration of the echo canceller. Reference is now made to FIG. 3, which shows, in block diagram form, one example embodiment of a reader 200.

The reader 200 includes a first switch 202 between the circulator 104 and the combiner 108. In this example embodiment, a second switch 204 is also provided between the scaling operator 126 and the combiner 108. Also shown in this example is a bandpass filter 115 before the low noise amplifier 114. The switches 202 and 204 may be denoted SW1 and SW2, respectively.

The transmitter section 102 is illustrated as including a local oscillator 160 for generating the carrier wave signal $V_L(t)$, one or more splitters 162 for routing the carrier wave signal $V_L(t)$ to various points in the reader 200, and a modulator 164. The modulator 164 operates under control of the processor 150 in this embodiment. The processor 150 may supply an information or trigger signal to the modulator 164 for modulation of the carrier wave signal $V_L(t)$.

The first switch 202 and the second switch 204 are shown to operate under control of the cancel control module 124, although in other embodiments they may operate under control of some other element of the reader 200 such as the processor 150. The switches 202, 204 are used during a calibration phase. In some cases, the switches 202, 204 may be located elsewhere in the circuit. In some embodiments, the functions of the switches 202, 204 during calibration may be implemented using other electrical or mechanical devices.

In this example, the combiner 108 is configured as an adder, however it will be appreciated that the combiner 108 may be configured to perform another operation with respect to combination of the received signal $V_R(t)$ and the cancel signal $V_C(t)$, such as subtraction. In the present embodiment, the corrected signal $V_D(t)$ is defined as (the time index has been omitted for brevity):

$$V_D = V_R + V_C$$

The resulting error signal, $V_E$, may be expressed as:

$$V_E = K_D \times V_D \times V_L^*$$

In the above expression, $K_D$ is complex circuit transfer characteristic that includes the effects of the bandpass filter 115 and the low-noise amplifier 114, and $V_L^*$ is the conjugate of the carrier wave signal used in the down-conversion. Plugging in the expressions for $V_D$ and $V_C$, we obtain:

$$V_E = (K_D \times V_R \times V_L^*) + (K_D \times K_C \times V_G \times V_L \times V_L^*)$$

The internal transfer scaling function from $V_G$ to $V_E$ is denoted $\beta$ as discussed above. The quantity $\beta$ may be given by:

$$\beta = K_D \times K_C \times |V_L|^2$$

Accordingly, the expression for $V_E$ may be rewritten as:

$$V_E = (K_D \times V_R \times V_L^*) + (\beta \times V_G)$$

In order to calibrate the reader 200 and obtain an initial estimation for the transfer function $\beta$, the reader 200 uses a two-step calibration process. In the first step, the first switch 202 is opened such that the received RF signal $V_R$ is zero. Under this condition, the scaling control signal $V_G$ is set to a known value $C_G$ and the error signal $V_E$ is measured to obtain an estimate $\hat{\beta}$ of the transfer function $\beta$. The estimate may be expressed as follows:

$$\hat{\beta} = \frac{V_E}{C_G}, \text{ switch } SW1 \text{ open}, V_G = C_G$$

Under this calibration operation, $V_G$ is not updated based on $V_E$, but rather is maintained at the known value $C_G$ while $V_E$ is measured in order to estimate the transfer function.

The second step of the calibration phase is to close the first switch 202 and set the scaling control signal $V_G$ to zero. The error signal $V_E$ under that condition is then measured, which then leads to a starting value for the scaling control signal $V_G$. This may be expressed as:

$$V_E(0) = V_E, \text{ switch } SW1 \text{ closed}, V_G = 0$$

$$V_G(1) = -\frac{V_E(0)}{\hat{\beta}}$$

The initialization of $V_G(1)$ based on the measured $V_E(0)$, will lead to an error signal of $V_E(1)$ given by:

$$V_E(1) = (K_D \times V_R \times V_L^*) + \beta \times \left(-\frac{V_E(0)}{\hat{\beta}}\right)$$

$$V_E(1) = K_D \times V_R \times V_L^* \times \left(1 - \frac{\beta}{\hat{\beta}}\right)$$

It will be appreciated that the closer that the estimated transfer function $\hat{\beta}$ is to the actual transfer function $\beta$, the more quickly the error signal $V_E(t)$ approaches zero. With an exact match, the calibration would result in an exact solution for $V_G(t)$ for any received signal $V_R(t)$. It should also be noted that, other than effects due to vehicle motion (signal strength, phase change, shifting reflections), the echo or leakage signal $V_U(t)$ is essentially static over a communication interval. Note that the present description characterizes the process as an iterative approach and the brackets, e.g., (0) and (1), are intended to indicate sequential iterative steps. This is, however, for the purpose of the present description. The present echo cancellation process may be implemented as a continuous process rather than a strictly iterative one. It will also be appreciated that, at least in some embodiments, the calibration phase of operation and the calculations and determination described herein is carried out by the cancel control module 124. In many embodiments, the echo cancellation phase of operation (in which the scaling control signal $V_G$ is continually adjusted based on the error signal $V_E$) is also carried out by the cancel control module 124.

In some embodiments, the calibration phase may take into account various offsets that may be present in the reader circuitry. Offsets may results in a non-zero error signal $V_E(t)$ even in the absence of any stimuli, i.e., when $V_C = 0$ and $V_R = 0$. This may be expressed as:

$$V_E = (K_D \times V_R \times V_L^*) + \beta \times V_G + \delta$$

In this expression, $\delta$ is the offset voltage present at the output of the low-pass filter 122 when both $V_G$ and $V_R$ are zero. This offset voltage may be evaluated during the calibration phase by opening the first switch 202 and setting $V_G$ to zero, which gives us an estimated offset $\hat{\delta}$. Using this estimate, the estimated transfer function $\hat{\beta}$ may be better estimated by the cancel control module 124 as:

$$\hat{\beta} = \frac{V_E - \hat{\delta}}{C_G}$$

Likewise, the determination of $V_G(1)$ is also adjusted to remove the offset component:

$$V_G(1) = -\frac{V_E(0) - \hat{\delta}}{\hat{\beta}}$$

In another implementation, the cancel control module 124 may take into account the non-linearity in the circuit, e.g., $K_D$ and $K_C$ may be dependent on the signal levels, by denoting a residual error term $\epsilon$. The residual error after the first iteration may be expressed as follows:

$$V_E(1) = (K_D \times V_R \times V_L^*) + \beta \times V_G(1) + \delta = \varepsilon(1) + \delta$$

$$\varepsilon(1) = K_D \times V_R \times V_L^* \times \left(1 - \frac{\beta}{\hat{\beta}}\right)$$

It will also be appreciated that the echo or leakage signal $V_U$ may contain non-static elements due to vehicle movement. The changes in $V_U$ may be denoted $dV_U(t)$. In other words, the received signal may be expressed as:

$$V_R(n) = V_U(0) + dV_U(n) + V_S$$

Here, the index n is used to reflect the present description of the process as an iterative process. As noted above, the process is not necessarily implemented as an iterative process. The information signal $V_S$ is removed by the low pass filter, meaning that the error signal $V_E$ at the first iteration is given by:

$$V_E(1) = K_D \times dV_U(n) \times V_L^* + \varepsilon(1) + \delta$$

Using successive approximation, the content in $V_E$ due to $V_U$ may be continually reduced. For example, in the next iteration, the current error signal $V_E(1)$ is added to the previous error signal, $V_E(0)$, to provide a scaling control signal $V_G(2)$ expressed as:

$$V_G(2) = -\frac{V_E(0) + V_E(1) - \hat{\delta}}{\hat{\beta}}$$

The resulting error signal $V_E(2)$ will then be:

$$V_E(2) = (K_D \times V_R \times V_L^*) + \beta \times V_G(2) + \delta$$

$$V_E(2) = (K_D \times V_R \times V_L^*) + \beta \times \left(-\frac{V_E(0) + V_E(1) - \hat{\delta}}{\hat{\beta}}\right) + \delta$$

$$V_E(2) = [(K_D \times dV_U(1) \times V_L^*) + \varepsilon(1)] \times \left(1 - \frac{\beta}{\hat{\beta}}\right) + (K_D \times (dV_U(2) - dV_U(1)) \times V_L^*) + \delta$$

$$V_E(2) = r(dV_U) + \varepsilon(2) + \delta$$

In this expression, r( ) indicates the residual error due to changes in $V_U$. The residual error will reduce quickly and will track changes in $V_U$ provided that $(1-\beta/\hat{\beta})$ is less than one.

In yet another embodiment, the cancel control module 124 may take into account an offset in the cancel scaling circuit. That is, the cancel signal $V_C$ may not be zero when the scaling control signal $V_G$ is zero. This additional offset may denoted $\gamma$. The condition may be represented as:

$$V_E = (K_D \times V_R \times V_L^*) + \beta \times V_G + \delta + \gamma$$

During calibration, an estimate $\hat{\gamma}$ for this additional offset may be obtained somewhat indirectly using the switches and setting the scaling control signal $V_G$ to zero, as follows:

$$\delta = V_E|_{SW1\ open, SW2\ open, V_G=0}$$

$$\overline{(\gamma + \delta)} = V_E|_{SW1\ open, SW2\ open, V_G=0}$$

$$\hat{\gamma} = [\overline{(\gamma + \delta)} - \hat{\delta}]$$

The calibration phase determination of the estimated transfer function $\beta$ may then be formulated as:

$$\hat{\beta} = \frac{V_E|_{SW1\ open, SW2\ closed, V_G=C_G} - V_E|_{SW1\ open, SW2\ closed, V_G=0}}{C_G}$$

$$\hat{\beta} = \frac{(K_D \times K_C \times C_G \times V_L \times V_L^* + \gamma + \delta) - \overline{(\gamma + \delta)}}{C_G}$$

With both switches (SW1 and SW2) closed, error signal $V_E(0)$ may then be expressed as:

$$V_E(0) = V_E|_{SW1\ open, SW2\ open, V_G=0} = K_D \times V_R \times V_L^* + \gamma + \delta$$

This error signal then results in a scaling control signal $V_G(1)$ of:

$$V_G(1) = -\frac{V_E(0) - \hat{\delta}}{\hat{\beta}} = -\left(\frac{V_E(0) - \overline{(\gamma + \delta)}}{\hat{\beta}} + \frac{\hat{\gamma}}{\hat{\beta}}\right)$$

$$= -\left(\frac{K_D \times V_R \times V_L^* + \gamma + \delta - \overline{(\gamma + \delta)}}{\hat{\beta}} + \frac{\hat{\gamma}}{\hat{\beta}}\right)$$

$$\cong -\frac{K_D \times V_R \times V_L^* + \gamma}{\beta}$$

The unwanted echo or leakage signal $V_U$ may at least partly proportional to the transmitter output power. At operational transmit power, the echo or leakage signal may overwhelm the receiving input thresholds. The receiving input thresholds are at least partly driven by the limitations of the low-noise amplifier 114 that appears after the combiner 108. If the echo or leakage signal is too large, it may overwhelm the low-noise amplifier 114 and introduce degradation into other parts of the signal.

In one embodiment, the calibration phase may be adjusted to ensure effective calibration and echo cancellation while avoiding leakage signals above the receiver input threshold. In this embodiment, the receiver transmit power may be reduced by a factor of $X^2$ during the initial calibration measurement of VE(0), in which case, the measurement results in the following:

$$V_E(0) = V_E|_{SW1\ closed, SW2\ closed, V_G=0, TX=1/X} = \frac{K_D \times V_R \times V_L^*}{X} + \gamma + \delta$$

In the above expression, TX refers to the transmitter voltage. Note that it has been reduced by a factor of X for the purposes of conducting this measurement. Once a value has been obtained for $V_E(0)$, the reader sets the transmitter power back to normal and sets $V_G(1)$ to the following value:

$$V_G(1) = -\frac{1}{\hat{\beta}} \left(\hat{X} \times (V_E(0) - \overline{(\gamma + \delta)}) + \hat{\gamma}\right)$$

$$V_G(1) = -\frac{1}{\hat{\beta}} \left(\frac{\hat{X}}{X} \times K_D \times V_R \times V_L^* + \hat{X} \times [\gamma + \delta - \overline{(\gamma + \delta)}] + \hat{\gamma}\right)$$

$$\cong -\frac{K_D \times V_R \times V_L^* + \gamma}{\beta}$$

In these expressions, $\hat{X}$ is an estimate for X. The subsequent iterations/passes still track changes in the leakage or echo signal and converge on an optimal cancel signal. The next iteration of the scaling control signal is given by:

$$V_G(2) = -\frac{1}{\hat{\beta}} \left(V_E(1) + \hat{X} \times (V_E(0) - \overline{(\gamma + \delta)}) + \hat{\gamma}\right)$$

It will be appreciated that although the above example suggests reverting to an un-scaled transmit power after the first iteration, i.e., as soon as $V_E(0)$ has been measured, the reversion to an un-scaled transmit power may also be delayed until a later iteration j when $V_E$ is small enough and the echo cancellation effective enough to allow the transmit power to be increased without saturating the receiving input.

Combining all of the above-described embodiments, the following set of equations may be used for determining the calibration parameters:

$$\hat{\delta} = V_E|_{SW1\ open, SW2\ open, V_G=0}$$

$$\overline{(\gamma + \delta)} = V_E|_{SW1\ open, SW2\ closed, V_G=0}$$

$$\hat{\gamma} = [\overline{(\gamma + \delta)} - \hat{\delta}]$$

$$\hat{\beta} = \frac{V_E|_{SW1\ open, SW2\ closed, V_G=C_G} - V_E|_{SW1\ open, SW2\ closed, V_G=0}}{C_G}$$

The initial j samples use an attenuated transmitter signal:

$$V_E(j-1) = V_E|_{SW1\ open, SW2\ open, V_G=0, TX=1/X}$$

Subsequently, the transmitter signal is un-attenuated:

$$V_E(j) = V_E|_{SW1\ open, SW2\ open, V_G=0, TX=1}$$

The scaling control signal at iteration n (or time t in a continuous signal embodiment), is given by:

$$V_G(n) = -\frac{1}{\beta}\left(\sum_{k=j}^{n-1} V_E(k)\bigg|_{TX=1} + \hat{X} \times \sum_{k=0}^{j-1} V_E(k)\bigg|_{TX=1/X} - \hat{X} \times (\widehat{\gamma+\delta}) + \hat{\gamma}\right)$$

$$V_E(n) = K_D \times V_R \times V_L^* + \beta \times V_G(n) + \gamma + \delta$$

$$\beta = K_D \times K_C \times V_L \times V_L^*$$

The cancel control module 124, the scaling operator 126, or both, may be implemented by way of programmable integrated circuit components, application-specific integrated circuits, analog devices, or combinations of those components.

The reader 100, 200 may be implemented using a combination of digital and RF components, including one or more suitably programmed microprocessors or microcontrollers. The processor 150 and various other components may be implemented using an ASIC in some embodiments.

CONCLUSION

The present subject matter may be embodied in other specific forms without departing from the spirit or essential characteristics thereof. Certain adaptations and modifications of the subject matter will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for echo cancellation in a reader for a passive RFID system, comprising:
    transmitting a carrier signal and receiving a backscatter-modulated signal;
    combining a cancel signal from an echo canceller with the backscatter-modulated signal to obtain a corrected signal;
    downconverting the corrected signal to a baseband signal using the carrier signal;
    after downconverting, feeding the baseband signal to a demodulator and to the echo canceller;
    demodulating, by the demodulator, the baseband signal to obtain transponder information;
    low-pass filtering, by the echo canceller, the baseband signal to remove modulated transponder information and produce an error signal; and
    updating, by the echo canceller, the cancel signal, wherein the cancel signal is based upon the error signal, the carrier signal, and an estimated complex-valued transfer function, and wherein the cancel signal is proportional to an integral of the error signal over time divided by the estimated complex-valued transfer function or proportional to a cumulative sum of the error signal over a window of samples, divided by the estimated complex-valued transfer function.

2. The method of claim 1, wherein updating the cancel signal comprises:
    generating a complex scaling control signal based upon the error signal and the estimated complex-valued transfer function; and
    generating the cancel signal based upon the scaling control signal, the carrier signal and a complex circuit transfer characteristic of a scaling operator.

3. An RFID reader, comprising:
    an antenna;
    a transmitter section to generate a carrier signal; and
    a receiver section coupled to the antenna for receiving a backscatter-modulated signal from a transponder, the receiver section including:
        an echo canceller including a combiner to combine the backscatter-modulated signal with a cancel signal to produce a corrected signal,
        a down-converter to down-convert the corrected signal to a baseband signal using the carrier signal, and
        a demodulator to demodulate the baseband signal to obtain transponder information,
        wherein the echo canceller low-pass filters modulated transponder information out of the baseband signal to obtain an error signal and generates the cancel signal based upon the error signal, the carrier signal, and an estimated complex-valued transfer function, and wherein the echo canceller is configured to generate the cancel signal proportional to an integral of the error signal over time divided by the estimated complex-valued transfer function or proportional to a cumulative sum of the error signal over a window of samples, divided by the estimated complex-valued transfer function; and
    wherein the down-converter feeds the baseband signal to the demodulator and to the echo canceller.

4. The RFID reader of claim 3, wherein the echo canceller is configured to generate the cancel signal by:
    generating a scaling control signal based upon the error signal and the estimated complex-valued transfer function; and
    generating the cancel signal based upon the scaling control signal, the carrier signal and a complex circuit transfer characteristic of a scaling operator.

5. A method of calibrating a reader for echo cancellation in an RFID system, the reader including a transmit section to generate a carrier signal and a receive section including a combiner coupled to an antenna through a first switch, the receive section further including a cancel signal generator to produce a cancel signal to be input to the combiner and a downconverter coupled to the output of the combiner to produce a downconverted combined signal, the method comprising:
    opening the first switch to isolate the receive section from the antenna;
    while the first switch is open,
        setting the cancel signal to a predetermined level,
        low-pass filtering the downconverted combined signal to obtain an initial error signal, and
        determining an estimated complex-valued transfer function for the cancel signal generator based upon the predetermined level and the initial error signal;
    closing the first switch; and
    updating the cancel signal based upon a ratio of a newly-measured error signal to the estimated complex-valued transfer function, wherein the cancel signal is proportional to an integral of the newly-measured error signal over time divided by the estimated complex-valued transfer function or the cancel signal is proportional to a cumulative sum of the newly-measured error signal over a window of samples, divided by the estimated complex-valued transfer function.

6. The method claimed in claim 5, wherein the cancel signal generator includes a cancel control module to generate a scaling control signal and includes a scaling operator to generate the cancel signal based on the carrier signal and the scaling control signal, wherein setting the cancel signal to a predetermined level comprises setting a fixed scaling control signal value, and wherein determining the estimated complex-valued transfer function includes calculating the ratio of the initial error signal to the fixed scaling control signal value.

7. The method claimed in claim 6, further comprising:
estimating a first offset value by, when the first switch is open, setting the scaling control signal to zero, measuring a resulting error signal, and setting the first offset value to the resulting error signal; and
wherein determining the estimated complex-valued transfer function includes subtracting the first offset value from the initial error signal, and wherein updating the cancel signal includes subtracting the first offset value from the newly-measured error signal.

8. The method claimed in claim 5, wherein updating the cancel signal comprises:
setting the scaling control signal to zero;
measuring a resulting error signal; and
setting the scaling control signal to the negative ratio of the resulting error signal to the estimated complex-valued transfer function.

9. The method claimed in claim 5, wherein updating the cancel signal comprises setting the scaling control signal based upon a negative ratio of the cumulative sum of error signals divided to the estimated complex-valued transfer function.

10. The method claimed in claim 5, wherein the receive section further includes a second switch between the cancel signal generator and the combiner, and wherein the method further comprises:
estimating a first offset value by measuring the initial error signal with both the first switch and the second switch open; and
wherein determining the estimated complex-valued transfer function includes subtracting the first offset value from the initial error signal, and wherein updating the cancel signal includes subtracting the first offset value from the newly-measured error signal.

11. The method claimed in claim 10, wherein the cancel signal generator generates the cancel signal proportional to a scaling control signal, and wherein the method further comprising:
estimating a second offset value by closing the second switch, setting the scaling control signal to zero, measuring a resulting error signal, and subtracting the first offset value from the resulting error signal to obtain the second offset value; and
wherein updating the cancel signal includes basing the scaling control signal, in part, upon the first offset value, the second offset value, and the estimated complex-valued transfer function.

12. The method claimed in claim 5, further comprising attenuating the carrier signal at the transmit section by a factor for at least some error signal measurements, and wherein updating the cancel signal comprises generating the cancel signal proportional to a sum of cumulative error signal measurements divided by the estimated complex-valued transfer function, and wherein the error signal measurements based upon the attenuated carrier signal are scaled by the factor.

13. An RFID reader, comprising:
an antenna;
a transmitter section to generate a carrier signal; and
a receiver section coupled to the antenna for receiving a backscatter-modulated signal from a transponder, the receiver section including:
an echo canceller including a combiner to combine the backscatter-modulated signal with a cancel signal to produce a corrected signal,
a down-converter to down-convert the corrected signal to a baseband signal using the carrier signal,
a first switch to couple the antenna to the combiner, and
a demodulator to demodulate the baseband signal to obtain transponder information,
wherein the echo canceller is configured to open the first switch and, while the first switch is open,
set the cancel signal to a predetermined level,
low-pass filter the baseband signal to obtain an initial error signal, and
determine an estimated complex-valued transfer function based upon the predetermined level and the initial error signal, and
wherein the echo canceller updates the cancel signal based upon a ratio of a newly-measured error signal to the estimated complex-valued transfer function;
wherein the cancel signal is proportional to an integral of the newly-measured error signal over time divided by the estimated complex-valued transfer function or the cancel signal is proportional to a cumulative sum of the newly-measured error signal over a window of samples, divided by the estimated complex-valued transfer function.

14. The RFID reader claimed in claim 13, wherein the echo canceller comprises a cancel control module to generate a scaling control signal and a scaling operator to generate the cancel signal based on the carrier signal and the scaling control signal, wherein the cancel signal is set to a predetermined level by setting a fixed scaling control signal value, and wherein the estimated complex-valued transfer function is determined by calculating the ratio of the initial error signal to the fixed scaling control signal value.

15. The RFID reader claimed in claim 14, wherein the echo canceller is further configured to estimate a first offset value by, when the first switch is open, setting the scaling control signal to zero, measuring a resulting error signal, and setting the first offset value to the resulting error signal; and
wherein the echo canceller is further configured to determine the estimated complex-valued transfer function by subtracting the first offset value from the initial error signal, and to update the cancel signal by subtracting the first offset value from the newly-measured error signal.

16. The RFID reader claimed in claim 13, wherein the echo canceller is configured to:
set the scaling control signal to zero;
measure a resulting error signal; and
set the scaling control signal to the negative ratio of the resulting error signal to the estimated complex-valued transfer function.

17. The RFID reader claimed in claim 13, wherein the echo canceller is configured to update the cancel signal by setting the scaling control signal based upon a negative ratio of the cumulative sum of error signals divided to the estimated complex-valued transfer function.

18. The RFID reader claimed in claim 13, wherein the receive section further includes a second switch between the cancel signal generator and the combiner, wherein the echo canceller is further configured to estimate a first offset value by measuring the initial error signal with both the first switch and the second switch open, and wherein the echo canceller is configured to determine the estimated complex-valued transfer function by subtracting the first offset value from the initial error signal, and to update the cancel signal by subtracting the first offset value from the newly-measured error signal.

19. The RFID reader claimed in claim 18, wherein the echo canceller includes a cancel control module to generate a scaling control signal and a scaling operator to generate the cancel signal proportional to the scaling control signal, and wherein the echo canceller is further configured to:

estimate a second offset value by closing the second switch, setting the scaling control signal to zero, measuring a resulting error signal, and subtracting the first offset value from the resulting error signal to obtain the second offset value; and update the scaling control signal based, in part, upon the first offset value, the second offset value, and the estimated complex-valued transfer function.

20. The RFID reader claimed in claim 13, wherein the transmit section is configured to attenuate the carrier signal by a factor for at least some error signal measurements, wherein the echo canceller is configured to update the cancel signal by generating the cancel signal proportional to a sum of cumulative error signal measurements divided by the estimated complex-valued transfer function, and wherein the error signal measurements based upon the attenuated carrier signal are scaled by the factor.

* * * * *